(12) United States Patent
Tang et al.

(10) Patent No.: US 8,625,301 B2
(45) Date of Patent: Jan. 7, 2014

(54) ELECTRONIC DEVICE WITH LATCHING MODULE

(75) Inventors: Zi-Ming Tang, Shenzhen (CN); Qiong Huang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 155 days.

(21) Appl. No.: 13/083,706

(22) Filed: Apr. 11, 2011

(65) Prior Publication Data

US 2012/0099253 A1    Apr. 26, 2012

(30) Foreign Application Priority Data

Oct. 22, 2010    (CN) .......................... 2010 1 0516255

(51) Int. Cl.
*H05K 7/14*    (2006.01)
(52) U.S. Cl.
USPC .......... 361/799; 349/58; 349/60; 361/679.01; 361/801; 361/816
(58) Field of Classification Search
USPC ...................................... 349/56, 60; 361/799
See application file for complete search history.

(56) References Cited

U.S. PATENT DOCUMENTS

| | | | | |
|---|---|---|---|---|
| 4,803,306 | A * | 2/1989 | Malmquist | 174/351 |
| 5,557,507 | A * | 9/1996 | Koike et al. | 361/816 |
| 5,703,665 | A * | 12/1997 | Muramatsu et al. | 349/60 |
| 6,532,152 | B1 * | 3/2003 | White et al. | 361/692 |
| 6,593,979 | B1 * | 7/2003 | Ha et al. | 349/58 |
| 2002/0125815 | A1 * | 9/2002 | Wakita | 313/491 |
| 2004/0246397 | A1 * | 12/2004 | Kang et al. | 349/58 |
| 2006/0034042 | A1 * | 2/2006 | Hisano et al. | 361/681 |
| 2009/0073338 | A1 * | 3/2009 | Jeong | 349/58 |
| 2010/0046178 | A1 * | 2/2010 | Bao | 361/752 |

OTHER PUBLICATIONS

CN 200820176673.2 Publication.*

* cited by examiner

*Primary Examiner* — Tuan T Dinh
*Assistant Examiner* — Steven Sawyer
(74) *Attorney, Agent, or Firm* — Altis Law Group, Inc.

(57) ABSTRACT

An electronic device includes a housing, a connecting sheet, a display panel and a fixing module. The display panel is fixed on the connecting sheet. The fixing module includes a first latching member formed on the housing and a second latching member formed on the connecting sheet. The first latching member is detachably latched with the second latching member, such that the connecting sheet adhered to the display panel is detachably fixed on the housing.

15 Claims, 6 Drawing Sheets

ELECTRONIC DEVICE WITH LATCHING MODULE

BACKGROUND

1. Technical Field

The present disclosure relates generally to electronic devices, more particularly, to an electronic device including a housing and a latching module.

2. Description of Related Art

Many electronic devices, such tablet computers, mobile phones, and various other devices, include a housing and a display panel. The display panel is often fixed to the housing via a plurality of screws. However, disassembling or assembling of the electronic device is troublesome. In addition, the overall aesthetic appearance of the electronic device will not be very good because of the visible screws. The display panel is also often adhered to the housing via adhesive, which may damage the display panel due to the amount of force needed to disassemble the display panel from the housing.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
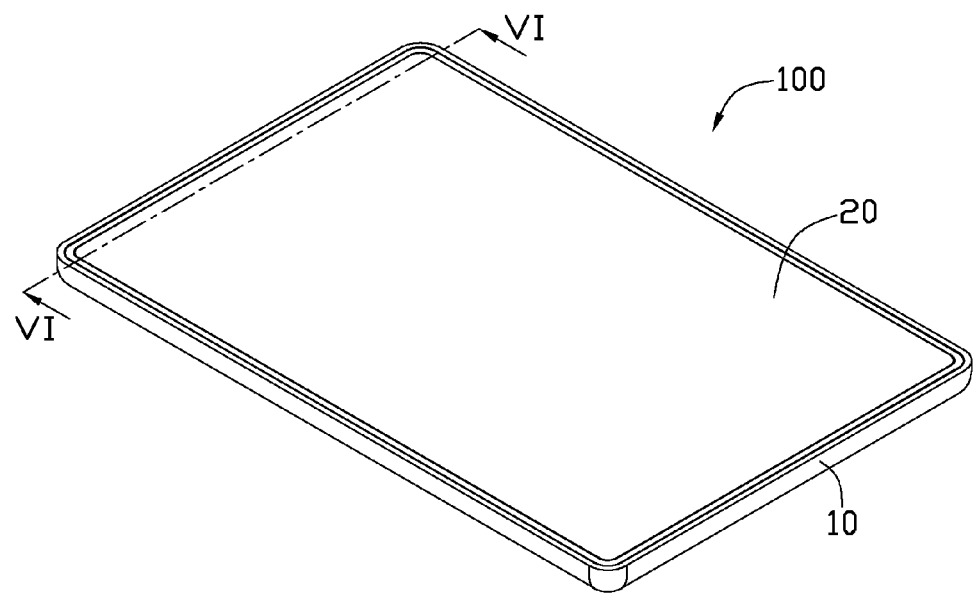
FIG. 1 is an isometric view of an embodiment of an electronic device.
Figure 2:
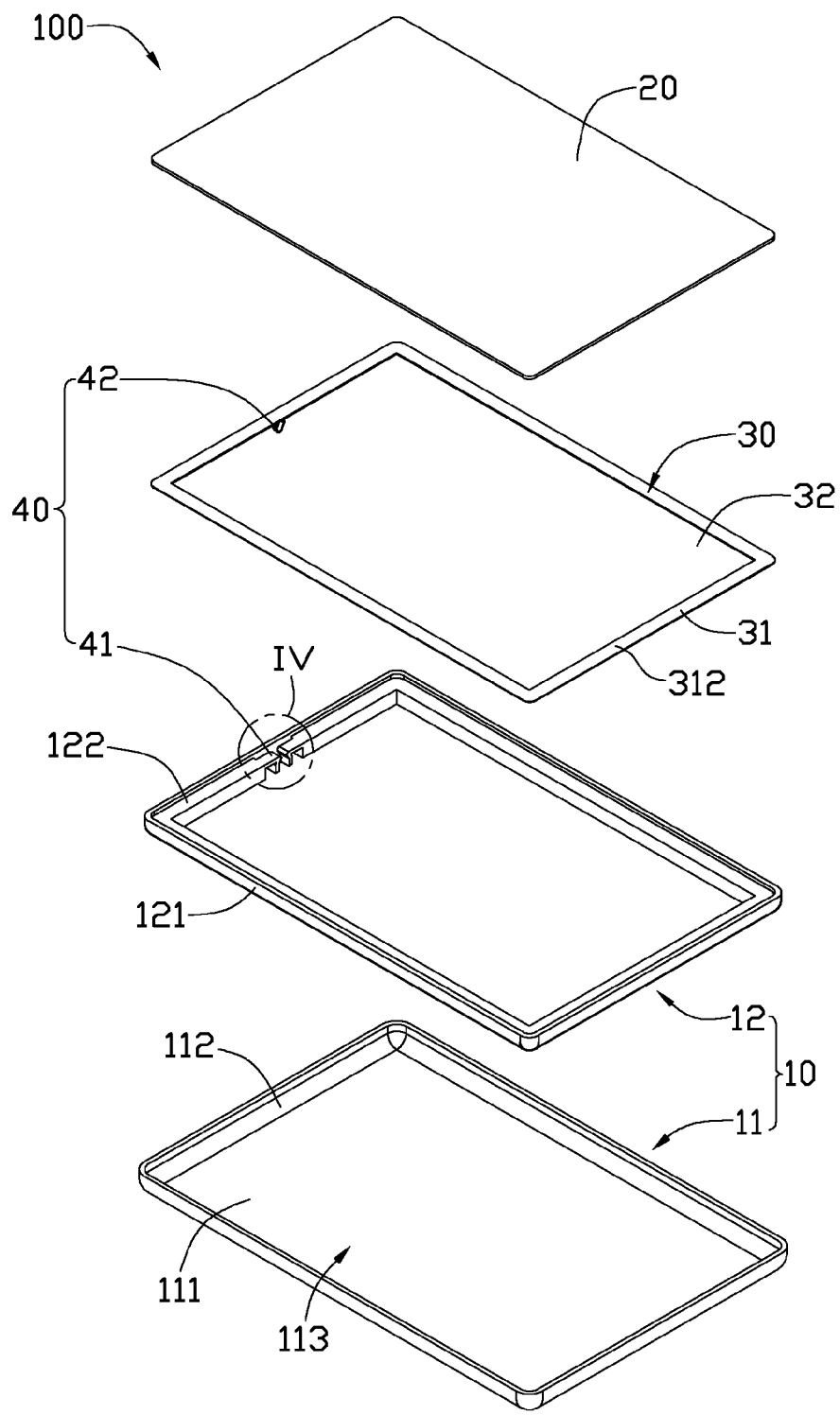
FIG. 2 is an exploded, isometric view of the electronic device of FIG. 1 including a housing, a display panel, and a connecting sheet.
Figure 3:
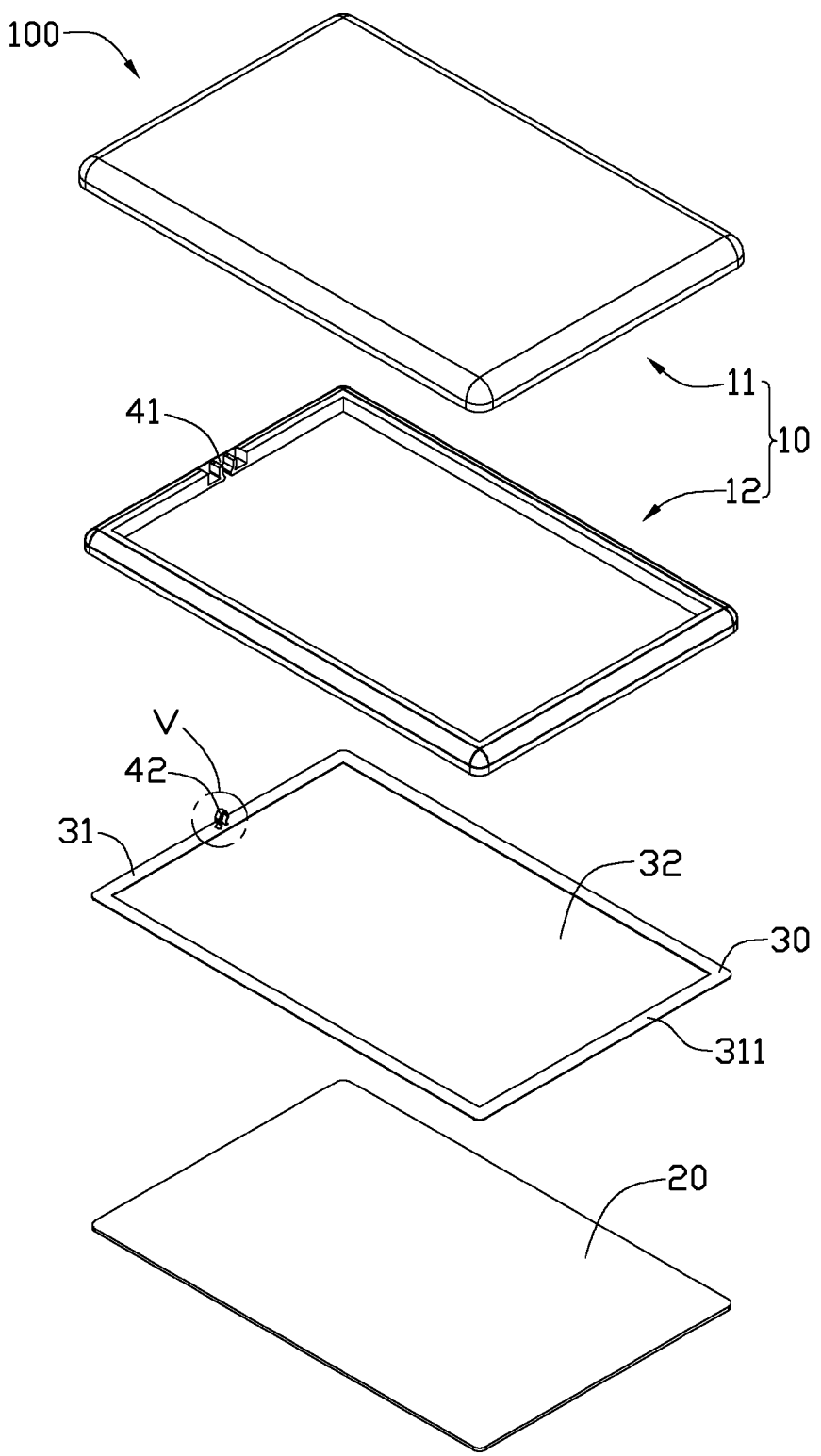
FIG. 3 is similar to FIG. 2, but viewed from another aspect.

Referring to FIGS. 1 through 3, an embodiment of an electronic device 100 includes a housing 10, a display panel 20, a connecting sheet 30, and a fixing module 40. The display panel 20 is adhered on the connecting sheet 30 via adhesive. The connecting sheet 30 is sandwiched between the housing 10 and the display panel 20. The fixing module 40 detachably fixes the connecting sheet 30 to the housing 10, and the connecting sheet 30 and the display panel 20 thereby can be detached from the housing 10 as a whole. The electronic device 100 includes other various functional modules (not shown). Other various functional modules are used to implement a variety of appropriate functions such as telephony, audio playback, or others. However, for simplicity, only the components related to the fixing module 40 are described.

The housing 10 is substantially rectangular, and includes a bottom housing 11 and a support frame 12. The support frame 12 is fixed in the bottom housing 11.

The bottom housing 11 includes a base 111 and a sidewall 112 extending from a periphery of the base 111. The base 111 and the sidewall 112 cooperatively define a receiving space 113 to receive the support frame 12 and the other various functional modules.

The support frame 12 is securely received in the receiving space 113 to support the connecting sheet 30 and the display panel 20. The support frame 12 is substantially a rectangular frame, and includes four support walls 121. A stepped surface 122 is formed along an inner part of the top surfaces of the four support walls 121, such that the stepped surface 122 and the support walls 121 cooperatively define a space to receive and support the connecting sheet 30 and the display panel 20. In the illustrated embodiment, the support frame 12 is fixed in the bottom housing 11 via adhesive. It should be noted that the support frame 12 can also be fixed in the bottom housing 11 via welding, or be integrally formed with the bottom housing 11. It should be appreciated that the outer sides of the support walls 121 contact tightly with the inner sides of the sidewall 112, and the structural strength and shock resistance of the housing 10 thereby is increased. The top surfaces of the support walls 121 are coplanar with the top surface of the sidewall 112, which adds to the overall aesthetic appearance of the electronic device 100.

The connecting sheet 30 is substantially sheet-like and made of metal. A through hole 32 is defined in the center of the connecting sheet 30. The connecting sheet 30 is about the same size as the stepped surface 122. The connecting sheet 30 includes four rim portions 31 connected to each other. Each rim portion 31 includes a bottom surface 311 away from the display panel 20 and a top surface 312 opposite to the bottom surface 311. The four rim portions 31 are positioned securely on the stepped surface 122.

The display panel 20 can be a touch panel. The display panel 20 is securely fixed on the top surface 312 via adhesive or glue. A top surface of the display panel 20 is approximately coplanar with the top surface of the support wall 121, which maintains the overall aesthetical appearance of the electronic device 100.

Figure 4:
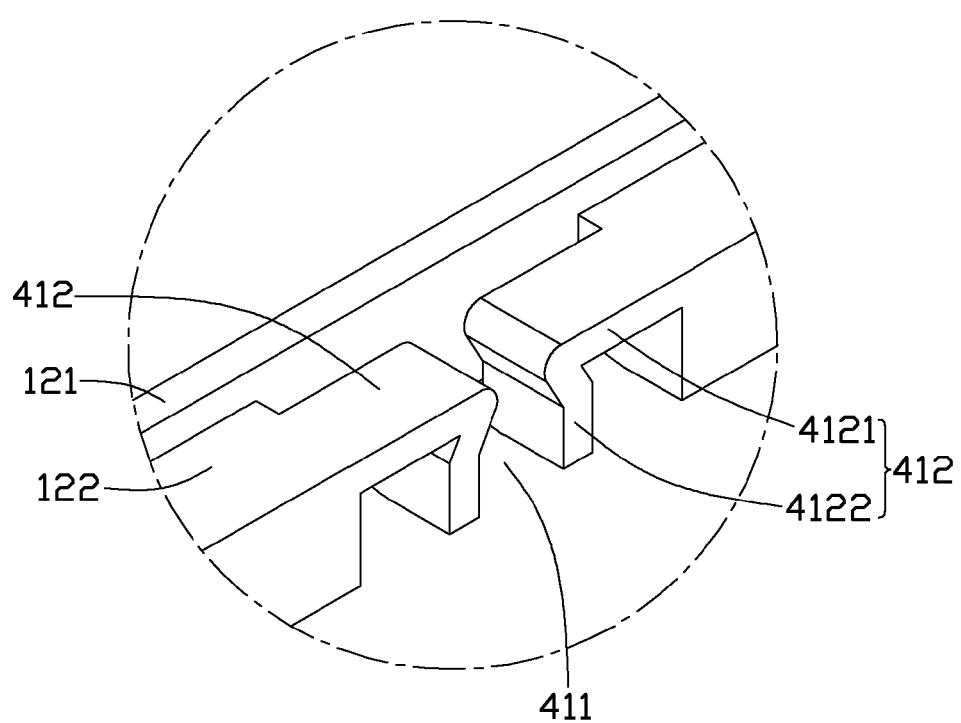
FIG. 4 is an enlarged view of a circled portion IV of FIG. 2.
Figure 5:
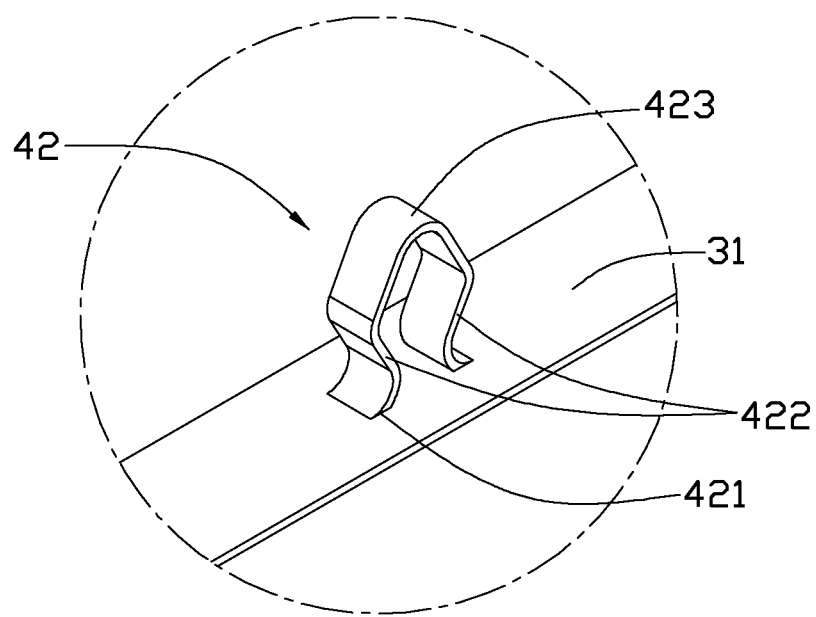
FIG. 5 is an enlarged view of a circled portion V of FIG. 3.
Figure 6:
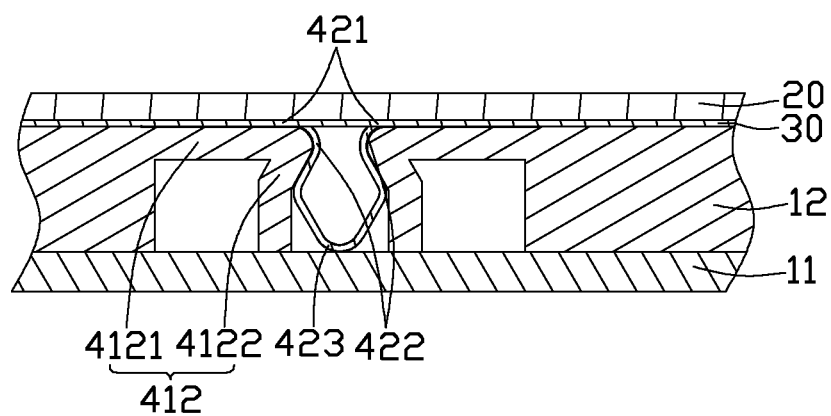
FIG. 6 is a partial, enlarged, cross-section of the electronic device of FIG. 1, taken along line VI-VI.

Referring to FIGS. 4 through 6, the fixing module 40 includes a first latching member 41 and a second latching member 42. The first latching member 41 is formed on the housing 10. The second latching member 42 is formed on the connecting sheet 30. The first latching member 41 is engaged with the second latching member 42 to detachably fix the connecting sheet 30 to the housing 10.

In the illustrated embodiment, the first latching member 41 is formed on one support wall 121. The first latching member 41 includes a latching slot 411 defined in the step surface 122 and two first latching portions 412 extending from the step surface 122 toward the base 111 and around the latching slot 411. The two first latching portions 412 are aligned opposite each other. Each first latching portion 412 employs a cantilever structure. Each first latching portion 412 includes a base body 4121, and a latching arm 4122 extending from one end of the base body 4121 and toward the base 111. The latching arm 4122 is elastic.

The second latching member 42 is made of metal, and is substantially a projection formed by punching. The second latching member 42 is engaged in the latching slot 411. The second latching member 42 includes two connecting ends 421, two second latching portions 422, and a guide portion 423. Each connecting end 421 is connected to the bottom surface 311 of one rim portion 31 via welding or adhesive. The two second latching portions 422 extend from one end of the two connecting ends 421, respectively. The guide portion 423 is substantially V-Shaped to guide in the latching and detaching of the first latching member 41. Two ends of the guide portion 423 are respectively connected to the free ends of the two second latching portions 422. The second latching member 42 is substantially rounded to benefit the latching process. If the second latching member 42 is engaged in the latching slot 411, an elastic force is generated to bias the second latching member 42 to the first latching member 41, and thereby the connecting sheet 30 is fixed to the support frame 12. Each first latching portion 412 is rounded to guide in the latching and detaching of the first latching member 41, and prevent the fixing module 40 from detachment failure.

In the illustrated embodiment, the first latching member 41 defines a narrow opening between the latching arms 4122. The second latching member 42 is bulbous and flexible, and latches in the narrow opening between the latching arms 4122.

In the illustrated embodiment, one fixing module 40 is presented, but more fixing modules 40 can be used as needed.

The fixing module 40 detachably fixes the connecting sheet 30 to the housing 10. In addition, the connecting sheet 30 is adhered to the display panel 20, and thereby the display panel 20 and the connecting sheet 30 can be easily detached from the housing 10 as a whole. Because the connecting sheet 30 is very thin, the electronic device 100 is not noticeably affected. In disassembly, a suction cup may be used to detach the display panel 20, which thereby deforms and unlocks the fixing module 40, such that the display panel 20 and the connecting sheet 30 can be detached from the housing 10 as a whole without damaging the display panel 20.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device, comprising:
   a housing comprising a bottom housing and a support frame fixed in the bottom housing, the support frame comprising a stepped surface formed along an inner part of a top surface of the support frame;
   a connecting sheet being substantially the same size as the stepped surface of the support frame and made of metal;
   a display panel directly fixed on the connecting sheet; and
   a fixing module, the fixing module comprising a first latching member formed on the support frame of the housing and a second latching member formed on the connecting sheet, wherein the first latching member is detachably latched with the second latching member, such that the connecting sheet directly adhered to the display panel is detachably and wholly fixed on the stepped surface of the support frame of the housing, wherein the first latching member comprises a latching slot defined in the stepped surface of the support frame of the housing, and the second member is a projection engaged with the latching slot.

2. The electronic device of claim 1, wherein the first latching member further comprises two first latching portions around the latching slot and aligned opposite each other, each first latching portion comprises a base body, and a latching arm extending from one end of the base body and toward the housing.

3. The electronic device of claim 1, wherein the second latching member is formed on the connecting sheet via adhesive or welding.

4. The electronic device of claim 1, wherein an outer side of the support frame contacts tightly with an inner side of the bottom housing.

5. The electronic device of claim 1, wherein the support frame comprises a plurality of support walls, the stepped surface and the support walls defines a space to receive and support the connecting sheet and the display panel.

6. The electronic device of claim 1, wherein the support frame is fixed in the bottom housing via adhesive or welding, or the support frame is integrally formed with the bottom housing.

7. The electronic device of claim 2, wherein each first latching portion employs a cantilever structure, and the latching arm is elastic.

8. The electronic device of claim 2, wherein the support frame comprises a plurality of support walls, and the two first latching portions extend from one support wall toward the housing.

9. The electronic device of claim 2, wherein the second latching member comprises two connecting ends, two second latching portions extending respectively from one end of the two connecting ends and a V-Shaped guide portion; two ends of the V-shaped guide portion are connected to the free ends of the two second latching portions respectively, and the two second latching portions are engaged in the latching slot.

10. The electronic device of claim 5, wherein the display panel is a touch panel, and the top surface of the display panel is coplanar with the top surface of the plurality of support walls of the support frame.

11. The electronic device of claim 8, wherein the first latching member defines a narrow opening between the two latching arms, and the second latching member is bulbous and flexible, and latches in the narrow opening of the first latching member.

12. The electronic device of claim 10, wherein the bottom housing comprises a base and a sidewall extending from a periphery of the base, the base and the sidewall cooperatively form a receiving space, the support frame is received in the receiving space, and the top surface of the plurality of support walls of the support frame is coplanar with a top surface of the sidewall.

13. An electronic device, comprising:
    a housing comprising a bottom housing and a support frame fixed in the bottom housing, the support frame comprising a stepped surface formed along an inner part of a top surface of the support frame;
    a fixing module comprising a plurality of first latching members;
    a connecting sheet being a frame having a shape substantially matching with the stepped surface of the support frame, the connecting sheet comprising a plurality of second latching members facing the stepped surface of the support frame; and
    a display panel fixed on the connecting sheet; wherein the plurality of first latching members are formed apart on the support frame of the housing according to the second latching members, and the second latching members are detachably latched with the first latching members, such that the connecting sheet with the display panel is detachably and wholly fixed on the stepped surface of the support frame of the housing, wherein the first latching member comprises a latching slot defined in the stepped surface of the support frame of the housing, and the second latching member is a projection engaged with the latching slot.

14. The electronic device of claim 13, wherein the first latching member further comprises two first latching portions around the latching slot and aligned opposite each other, each first latching portion comprises a base body, and a latching arm extending from one end of the base body and toward the housing.

15. The electronic device of claim 14, wherein the second latching member comprises two connecting ends, two second latching portions extending respectively from one end of the two connecting ends and a V-Shaped guide portion; two ends of the V-shaped guide portion are connected to the free ends of the two second latching portions respectively, and the two second latching portions are engaged in the latching slot.

* * * * *